United States Patent
Tian et al.

(10) Patent No.: US 11,729,733 B2
(45) Date of Patent: Aug. 15, 2023

(54) MECHANISMS FOR HANDLING DOPPLER EFFECT

(71) Applicant: Samsung Electronics Co., Ltd., Suwon-si (KR)

(72) Inventors: Shuang Tian, Cupertino, CA (US); Qiaoyang Ye, San Jose, CA (US); Jeongho Jeon, San Jose, CA (US); Joonyoung Cho, Portland, OR (US)

(73) Assignee: Samsung Electronics Co., Ltd., Suwon-si (KR)

( * ) Notice: Subject to any disclaimer, the term of this patent is extended or adjusted under 35 U.S.C. 154(b) by 12 days.

(21) Appl. No.: 17/127,689

(22) Filed: Dec. 18, 2020

(65) Prior Publication Data
US 2022/0039037 A1 Feb. 3, 2022

Related U.S. Application Data

(60) Provisional application No. 63/059,106, filed on Jul. 30, 2020.

(51) Int. Cl.
*H04W 56/00* (2009.01)
*H04W 36/00* (2009.01)

(52) U.S. Cl.
CPC ..... *H04W 56/004* (2013.01); *H04W 36/0055* (2013.01); *H04W 56/0035* (2013.01)

(58) Field of Classification Search
CPC .............................................. H04W 88/00–06
See application file for complete search history.

(56) References Cited

U.S. PATENT DOCUMENTS

2010/0080112 A1* 4/2010 Bertrand ............. H04L 27/2657
370/344
2011/0228863 A1 9/2011 Papasakellariou et al.
(Continued)

FOREIGN PATENT DOCUMENTS

WO 2017072745 A1 5/2017

OTHER PUBLICATIONS

International Search Report and Written Opinion of the International Searching Authority in connection with International Application No. PCT/KR2021/003179 dated Jun. 23, 2021, 8 pages.
(Continued)

*Primary Examiner* — San Htun

(57) ABSTRACT

Doppler pre-compensation is performed on synchronization signals using each of multiple Doppler pre-compensation patterns to generate a plurality of sets of Doppler pre-compensated synchronization signals that are transmitted using one or more beams. A signal indicating the Doppler pre-compensation patterns used is transmitted in one of a system information block (SIB) or a radio resource control (RRC) reconfiguration message, in connection with initial access by a user equipment (UE), idle UE cell reselection, connected UE data channel reception, or UE handover. The signal indicates Doppler pre-compensation patterns for a transmitting cell and Doppler pre-compensation patterns for one or more neighbor cells. The synchronization signal comprises a synchronization signal block (SSB) including a primary synchronization signal (PSS) and a secondary synchronization signal (SSS). Received Doppler pre-compensated synchronization signals are combined in the time domain in connection with timing synchronization detection, frequency offset (FO) estimation, or reference signal received power (RSRP) measurement.

20 Claims, 10 Drawing Sheets

(56) References Cited

U.S. PATENT DOCUMENTS

| | | | |
|---|---|---|---|
| 2016/0212734 A1 | 7/2016 | He et al. | |
| 2016/0227462 A1* | 8/2016 | Axmon | H04B 7/0842 |
| 2018/0241464 A1* | 8/2018 | Michaels | H04W 56/0045 |
| 2018/0324734 A1 | 11/2018 | Li et al. | |
| 2019/0261329 A1* | 8/2019 | Park | H04L 5/005 |
| 2021/0320685 A1* | 10/2021 | Venugopal | H04L 27/0014 |

OTHER PUBLICATIONS

Samsung, "Uplink timing advance/RACH procedure and Initial Access for NTN", R1-1912470, 3GPP TSG RAN WG1 Meeting #99, Reno, USA, Nov. 18-22, 2019, 12 pages.

Nokia et al., "Doppler Compensation, Uplink Timing Advance, Random Access and UE Location in NTN", R1-1911220, 3GPP TSG RAN WG1 Meeting #98bis, Chongqing, China, Oct. 14-20, 2019, 30 pages.

Nokia et al., "Positioning in NTN", R1-1913022, 3GPP TSG RAN WG1 Meeting #99, Reno, USA, Nov. 18-22, 2019, 7 pages.

"3rd Generation Partnership Project; Technical Specification Group Radio Access Network; Study on New Radio (NR) to support non-terrestrial networks (Release 15)", 3GPP TR 38.811 V15.2.0, Sep. 2019, 126 pages.

"3rd Generation Partnership Project; Technical Specification Group Radio Access Network; Solutions for NR to support non-terrestrial networks (NTN) (Release 16)", 3GPP TR 38.821 V16.0.0, Dec. 2019, 140 pages.

"3rd Generation Partnership Project; Technical Specification Group Radio Access Network; NR; Physical layer procedures for control (Release 15)", 3GPP TS 38.213 V15.5.0, Mar. 2019, 104 pages.

"3rd Generation Partnership Project; Technical Specification Group Radio Access Network; NR; Physical channels and modulation (Release 16)", 3GPP TS 38.211 V16.1.0, Mar. 2020, 73 pages.

"5G; NR; Radio Resource Control (RRC); Protocol specification (3GPP TS 38.331 version 15.5.1 Release 15)", ETSI TS 138 331 V15.5.1, May 2019, 488 pages.

Intellectual Property India, Examination Report dated May 24, 2022 regarding Application No. 202037027914, 7 pages.

\* cited by examiner

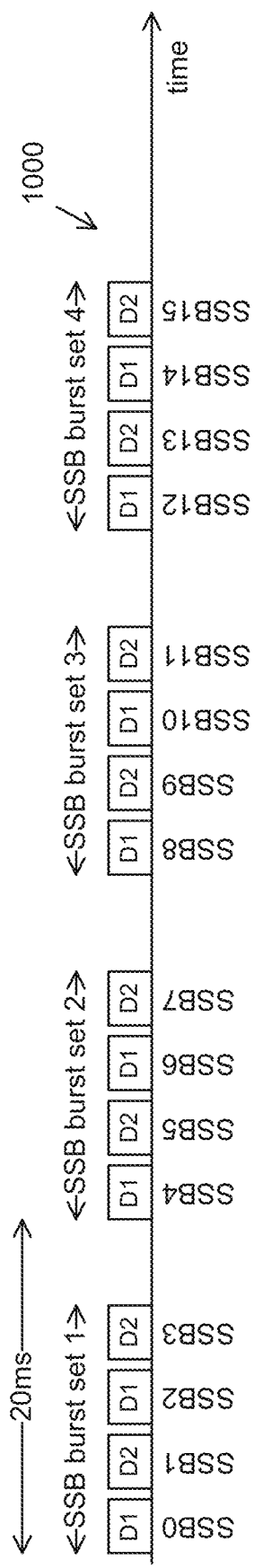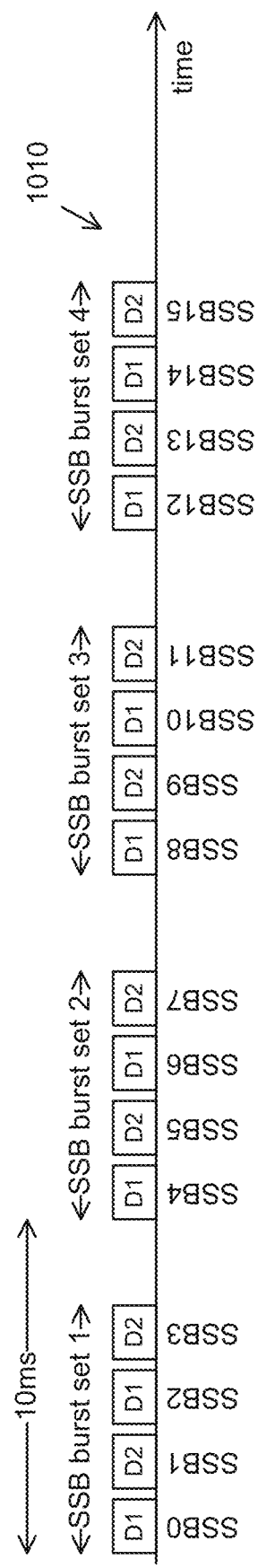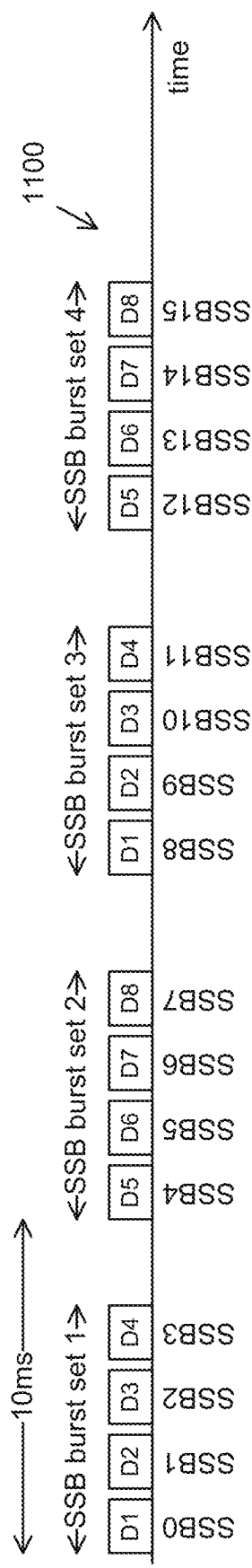

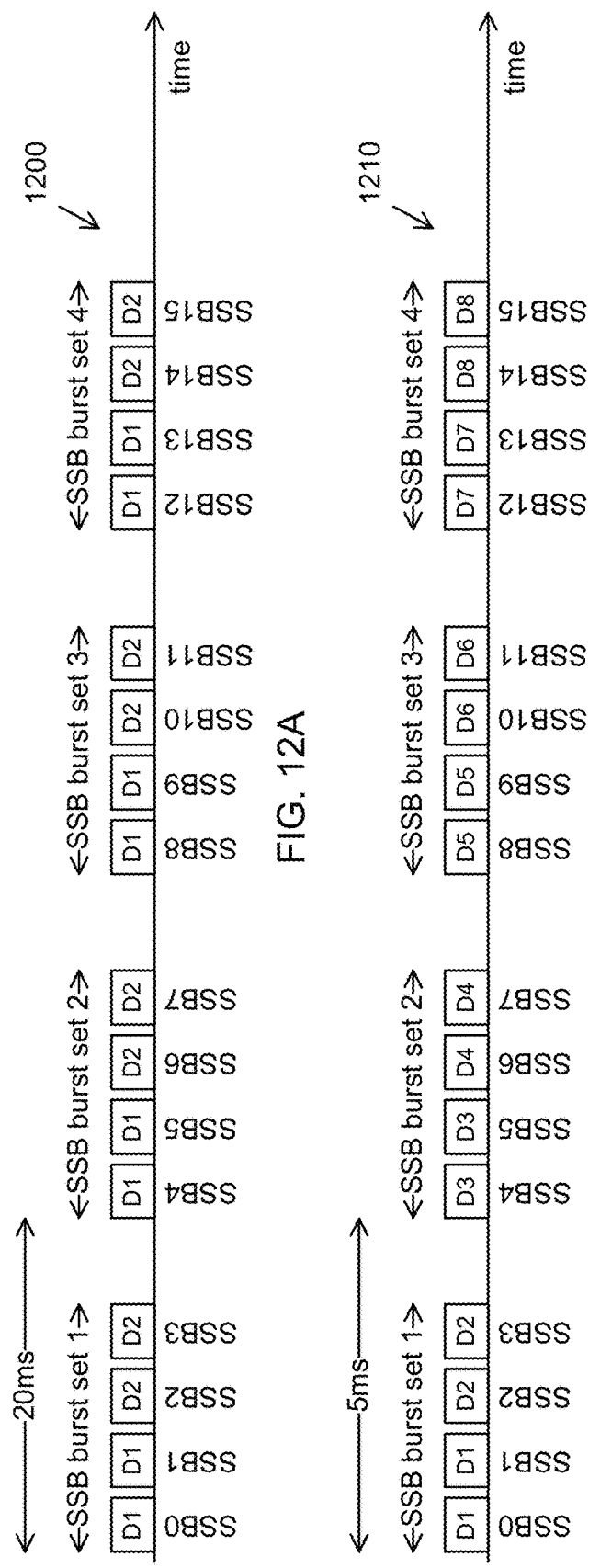
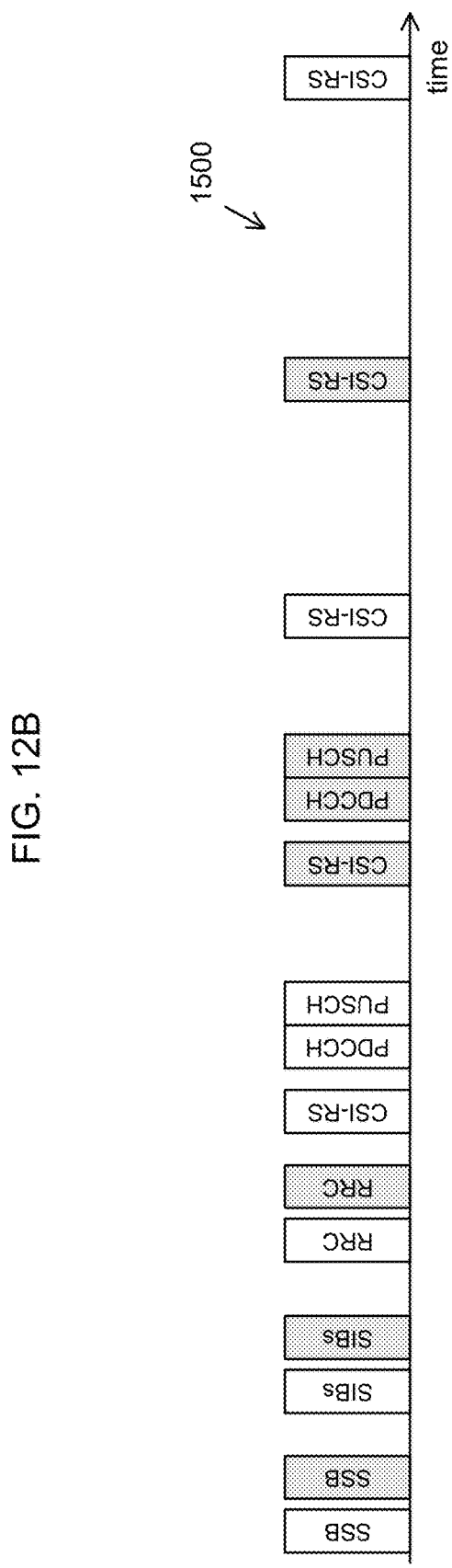
FIG. 12A
FIG. 12B
FIG. 15

MECHANISMS FOR HANDLING DOPPLER EFFECT

CROSS-REFERENCE TO RELATED APPLICATION AND CLAIM OF PRIORITY

This application claims priority under 35 U.S.C. § 119(e) to U.S. Provisional Patent Application No. 63/059,106 filed Jul. 30, 2020. The above-identified patent document(s) are incorporated herein by reference.

TECHNICAL FIELD

The present disclosure relates generally to Doppler pre-compensation, and more specifically to Doppler pre-compensation for large spot beam/cell size, particularly for different UEs at different radial positions from the center to the periphery of a spot beam/cell.

BACKGROUND

To meet the demand for wireless data traffic having increased since deployment of $4^{th}$ Generation (4G) or Long Term Evolution (LTE) communication systems and to enable various vertical applications, efforts have been made to develop and deploy an improved $5^{th}$ Generation (5G) and/or New Radio (NR) or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 giga-Hertz (GHz) or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and technologies associated therewith is for reference as certain embodiments of the present disclosure may be implemented in 5G systems, $6^{th}$ Generation (6G) systems, or even later releases which may use terahertz (THz) bands. However, the present disclosure is not limited to any particular class of systems or the frequency bands associated therewith, and embodiments of the present disclosure may be utilized in connection with any frequency band. For example, aspects of the present disclosure may also be applied to deployment of 5G communication systems, 6G communications systems, or communications using THz bands.

SUMMARY

A mechanism and electronic devices for multi-value Doppler pre-compensation takes into consideration of a variety of factors, such as spot beam/cell size, Doppler shift seen by the UE, and/or the Doppler shift difference among different UEs inside of a spot beam/cell.

Doppler pre-compensation is performed on synchronization signals using each of multiple Doppler pre-compensation patterns to generate a plurality of sets of Doppler pre-compensated synchronization signals that are transmitted using one or more beams. A signal indicating the Doppler pre-compensation patterns used is transmitted in one of a system information block (SIB) or a radio resource control (RRC) reconfiguration message, in connection with initial access by a user equipment (UE), idle UE cell reselection, connected UE data channel reception, or UE handover. The signal indicates Doppler pre-compensation patterns for a transmitting cell and Doppler pre-compensation patterns for one or more neighbor cells. The synchronization signal comprises a synchronization signal block (SSB) including a primary synchronization signal (PSS) and a secondary synchronization signal (SSS). Received Doppler pre-compensated synchronization signals are combined in the time domain in connection with timing synchronization detection, frequency offset (FO) estimation, or reference signal received power (RSRP) measurement.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIGS. 10A-10B illustrate examples for 2-Doppler pre-compensation SSB patterns (class A) according to embodiments of the present disclosure;

FIG. 11 illustrates an example for 8-Doppler pre-compensation SSB patterns (class A) according to embodiments of the present disclosure;

FIGS. 12A-12B illustrate examples for multi-Doppler pre-compensation SSB patterns (class B) according to embodiments of the present disclosure;

FIG. 15 illustrates an exemplary scheduling operation of 2-value Doppler pre-compensation according to embodiments of the present disclosure;

DETAILED DESCRIPTION

Figure 1:
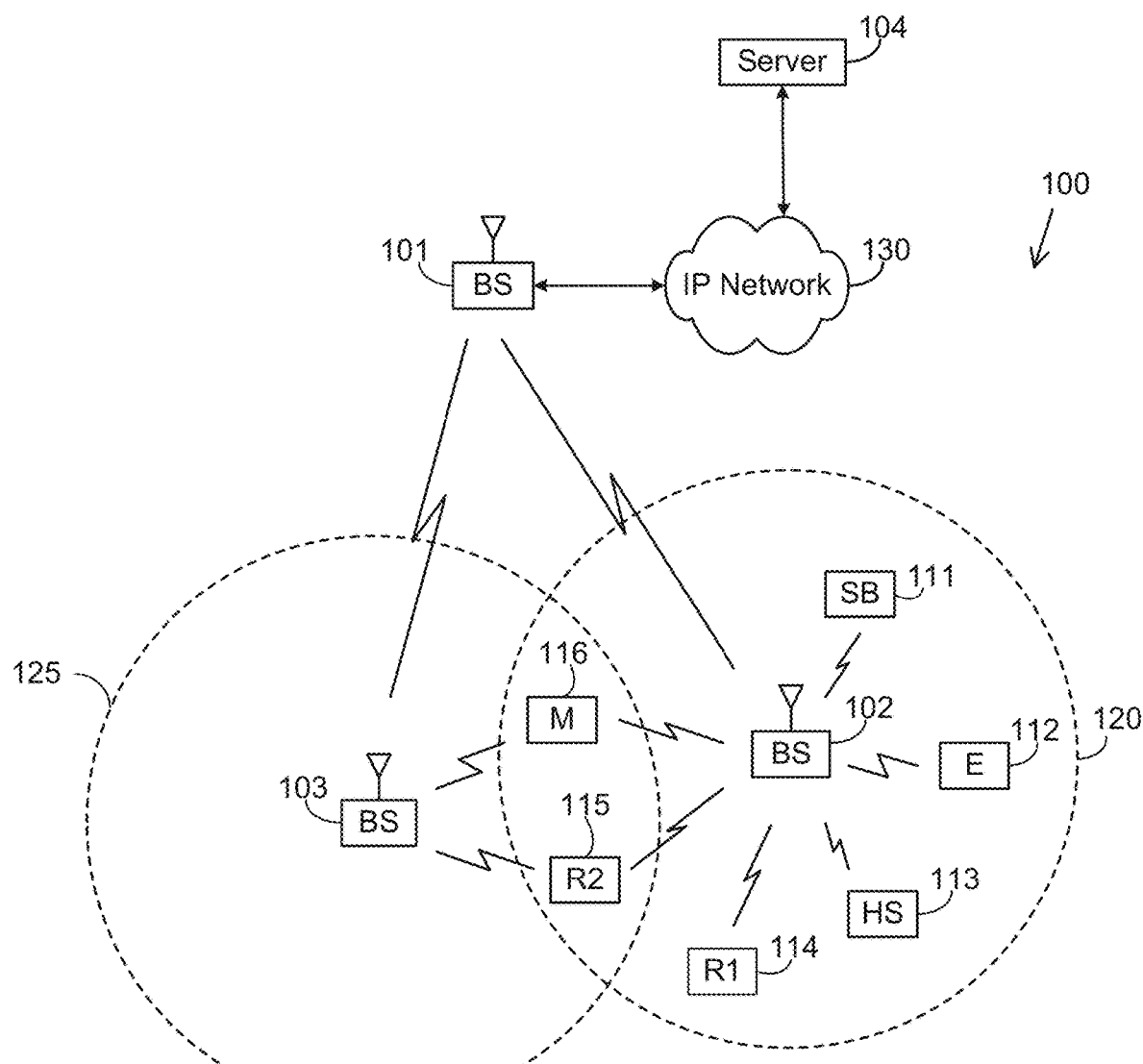
FIG. 1 illustrates an exemplary networked system according to various embodiments of this disclosure.

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

REFERENCES

[1] 3GPP, TR 38.811, Study on New Radio (NR) to support non-terrestrial networks, v15.2.0, September 2019.
[2] 3GPP, TR 38.821, Solutions for NR to support non-terrestrial networks (NTN), v16.0.0, December 2019.
[3] 3GPP, TS 38.213, NR: Physical layer procedures for control, v15.5.0, March 2019.
[4] 3GPP, TS 38.211, NR: Physical channels and modulation, v16.1.0, March 2020.
[5] 3GPP, TS 38.331, NR: Radio Resource Control (RRC) protocol specification, v15.5.1, April 2019.

The above-identified references are incorporated herein by reference.

Abbreviations

THz Terahertz
CFO carrier frequency offset
CSI-RS channel state information reference signal
FO frequency offset
BS base station
UE user equipment
NTN non-terrestrial networks
NR New Radio
LEO low earth orbits
LTE Long Term Evolution
3GPP 3rd Generation Partnership Project
PSS primary synchronization signal
SSS secondary synchronization signal
PBCH physical broadcast channel
SSB synchronization signal block
PAPR peak to average power ratio
FR frequency range
SFN system frame number
RSRP reference signal received power
PDCCH physical downlink control channel
PDSCH physical downlink shared channel Doppler Effect in Non-Terrestrial Networks Non-terrestrial networks (NTN) refer to networks that comprise airborne or spaceborne vehicle for transmission. Airborne vehicles include high altitude platforms, such as unmanned aircraft systems (UAS), operating at altitude between 8 and 50 kilometers (km). Spaceborne vehicles include satellites operating at low earth orbits (LEO), medium earth orbits (MEO), geostationary earth orbit (GEO), or in highly elliptical orbits (HEO). Non-terrestrial networks are important components for the fifth generation (5G) mobile communications system to increase coverage and availability in areas with no, or limited, terrestrial networks' services, such as scenarios of high speed trains, ships and aircraft [1], [2]. Doppler effect (or the Doppler shift) is in general not a factor in geostationary satellite systems because the GEO satellite is almost quasi static with respect to the UE on the earth, with only a small Doppler shift. However, Doppler shift is significant in LEO satellite systems due to the LEO satellite's very high speed relative to the earth's surface, which causes very large divergence of the received signals from the original frequencies and wavelengths.

Conventional Doppler Handling Techniques in LEO Systems

Conventionally, the very large Doppler shift caused by LEO satellite movement can be pre-compensated by the transmission equipment. Given the knowledge of satellite ephemeris and the satellite's spot beam location on the earth, the downlink signals transmitted from the satellite could be pre-compensated by the Doppler shift value targeting the center of the spot beam on the earth. The aim of this beam-center-targeting pre-compensation tries to limit the frequency offsets, including Doppler shifts for different UEs inside of a spot beam on the earth, to those within the UE's capability to handle. However, in case of large spot beam size (or diameter), the beam-center-targeting single-value Doppler pre-compensation would not be able to reduce the Doppler shifts sufficiently to be handled by UEs that are close to the edge of the spot beam (or cell).

This motivates use, as described in this disclosure, of a multi-value Doppler pre-compensation mechanism by taking into consideration of factors, such as spot beam/cell size, Doppler shift seen by the UE, and/or the Doppler shift difference among different UEs inside of a spot beam/cell. Multi-value Doppler pre-compensation according to this disclosure takes into consideration a variety of factors, such as spot beam/cell size, Doppler shift seen by the UE, and/or the Doppler shift difference among different UEs inside of a spot beam/cell. The BS/satellite may transmit different sets of synchronization signal blocks (SSB) applying different values of Doppler shifts for pre-compensation, targeting different parts of a spot beam/cell. The UEs in different parts of the spot beam/cell will be able to get access and connected to the network through a designated set of SSBs.

FIG. 1 illustrates an exemplary networked system according to various embodiments of this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station (BS) 101, a BS 102, and a BS 103. The BS 101 communicates with the BS 102 and the BS 103. The BS 101 also communicates with at least one Internet protocol (IP) network 130, such as the Internet, a proprietary IP network, or another data network.

The BS 102 provides wireless broadband access to the network 130 for a first plurality of user equipments (UEs) within a coverage area 120 of the BS 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R1); a UE 115, which may be located in a second residence (R2); and a UE 116, which may be a mobile device (M) like a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G, LTE, LTE Advanced (LTE-A), WiMAX, WiFi, or other wireless communication techniques.

Depending on the network type, other well-known terms may be used instead of "base station" or "BS," such as node B, evolved node B ("eNodeB" or "eNB"), a 5G node B ("gNodeB" or "gNB") or "access point." For the sake of convenience, the terms "base station" and/or "BS" are used in this disclosure to refer to network infrastructure components that provide wireless access to remote terminals. Also, depending on the network type, other well-known terms may be used instead of "user equipment" or "UE," such as "mobile station" (or "MS"), "subscriber station" (or "SS"), "remote terminal," "wireless terminal," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extent of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

Although FIG. 1 illustrates one example of a wireless network 100, various changes may be made to FIG. 1. For example, the wireless network 100 could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BS 101, 102, and/or 103 could provide access to other or additional external networks, such as external telephone networks or other types of data networks.

Figure 2:
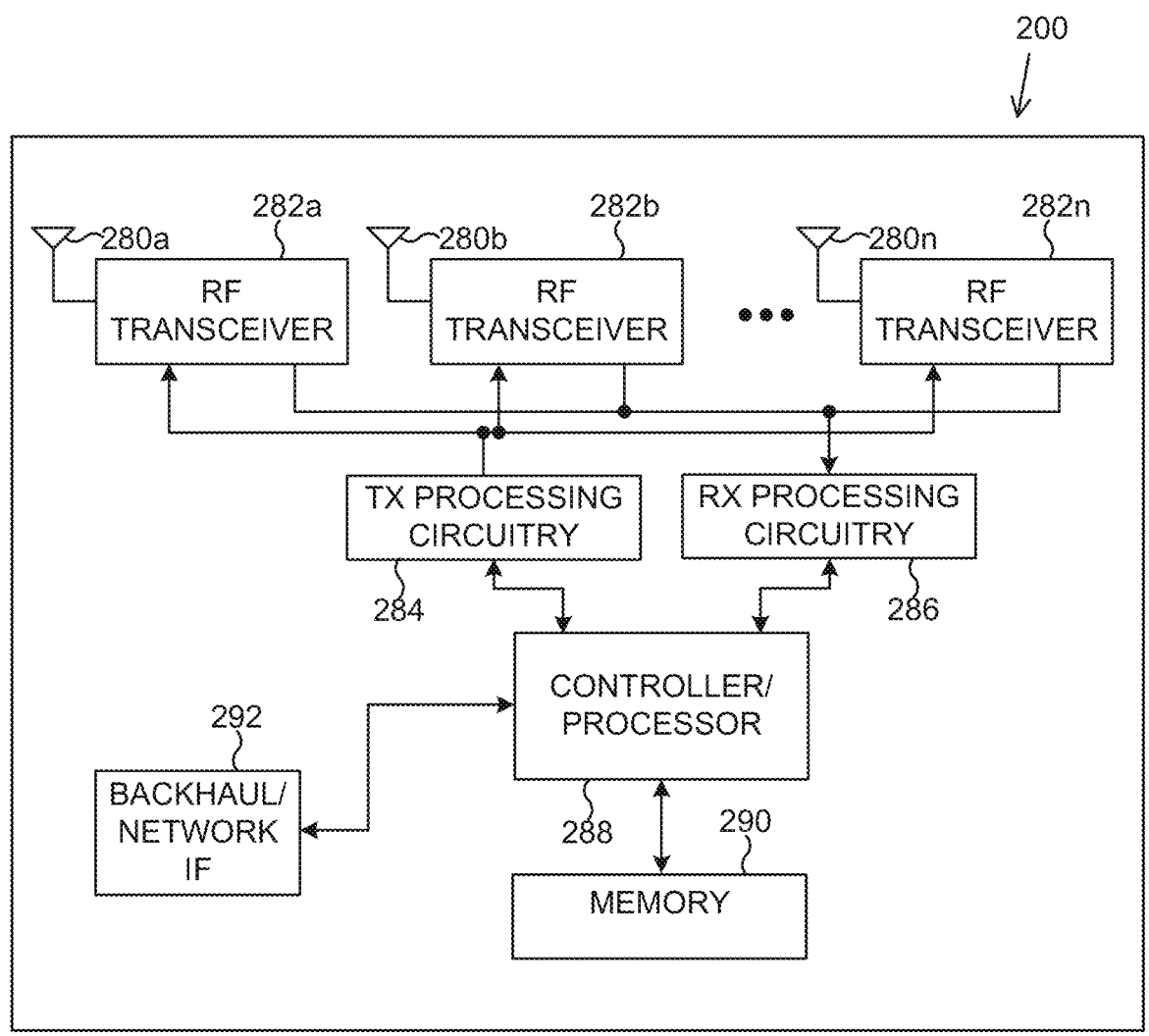
FIG. 2 illustrates an exemplary base station (BS) according to various embodiments of this disclosure.

FIG. 2 illustrates an exemplary base station (BS) according to various embodiments of this disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 280a-280n, multiple radio frequency (RF) transceivers 282a-282n, transmit (TX or Tx) processing circuitry 284, and receive (RX or Rx) processing circuitry 286. The BS 102 also includes a controller/processor 288, a memory 290, and a backhaul or network interface 292.

The RF transceivers 282a-282n receive, from the antennas 280a-280n, incoming RF signals, such as signals transmitted by UEs in the network 100. The RF transceivers 282a-282n down-convert the incoming RF signals to generate IF or baseband signals. The IF or baseband signals are sent to the RX processing circuitry 286, which generates processed baseband signals by filtering, decoding, and/or digitizing the baseband or IF signals. The RX processing circuitry 286 transmits the processed baseband signals to the controller/processor 288 for further processing.

The TX processing circuitry 284 receives analog or digital data (such as voice data, web data, e-mail, or interactive video game data) from the controller/processor 288. The TX processing circuitry 284 encodes, multiplexes, and/or digitizes the outgoing baseband data to generate processed baseband or IF signals. The RF transceivers 282a-282n receive the outgoing processed baseband or IF signals from the TX processing circuitry 284 and up-converts the baseband or IF signals to RF signals that are transmitted via the antennas 280a-280n.

The controller/processor 288 can include one or more processors or other processing devices that control the overall operation of the BS 102. For example, the controller/processor 288 could control the reception of forward channel signals and the transmission of reverse channel signals by the RF transceivers 282a-282n, the RX processing circuitry 286, and the TX processing circuitry 284 in accordance with well-known principles. The controller/processor 288 could support additional functions as well, such as more advanced wireless communication functions and/or processes described in further detail below. For instance, the controller/processor 288 could support beam forming or directional routing operations in which outgoing signals from multiple antennas 280a-280n are weighted differently to effectively steer the outgoing signals in a desired direction. Any of a wide variety of other functions could be supported in the BS 102 by the controller/processor 288. In some embodiments, the controller/processor 288 includes at least one microprocessor or microcontroller.

The controller/processor 288 is also capable of executing programs and other processes resident in the memory 290, such as a basic operating system (OS). The controller/processor 288 can move data into or out of the memory 290 as required by an executing process.

The controller/processor 288 is also coupled to the backhaul or network interface 292. The backhaul or network interface 292 allows the BS 102 to communicate with other devices or systems over a backhaul connection or over a network. The interface 292 could support communications over any suitable wired or wireless connection(s). For example, when the BS 102 is implemented as part of a cellular communication system (such as one supporting 6G, 5G, LTE, or LTE-A), the interface 292 could allow the BS 102 to communicate with other BSs over a wired or wireless backhaul connection. When the BS 102 is implemented as an access point, the interface 292 could allow the BS 102 to communicate over a wired or wireless local area network or over a wired or wireless connection to a larger network (such as the Internet). The interface 292 includes any suitable structure supporting communications over a wired or wireless connection, such as an Ethernet or RF transceiver.

The memory 290 is coupled to the controller/processor 288. Part of the memory 290 could include a RAM, and another part of the memory 290 could include a Flash memory or other ROM.

As described in more detail below, base stations in a networked computing system can be assigned as synchronization source BS or a slave BS based on interference relationships with other neighboring BSs. In some embodiments, the assignment can be provided by a shared spectrum manager. In other embodiments, the assignment can be agreed upon by the BSs in the networked computing system. Synchronization source BSs transmit OSS to slave BSs for establishing transmission timing of the slave BSs.

Although FIG. 2 illustrates one example of BS 102, various changes may be made to FIG. 2. For example, the BS 102 could include any number of each component shown in FIG. 2. As a particular example, an access point could include a number of interfaces 292, and the controller/processor 288 could support routing functions to route data between different network addresses. As another particular example, while shown as including a single instance of TX processing circuitry 284 and a single instance of RX processing circuitry 286, the gNB 102 could include multiple instances of each (such as one per RF transceiver). Also, various components in FIG. 2 could be combined, further subdivided, or omitted and additional components could be added according to particular needs.

Figure 3:
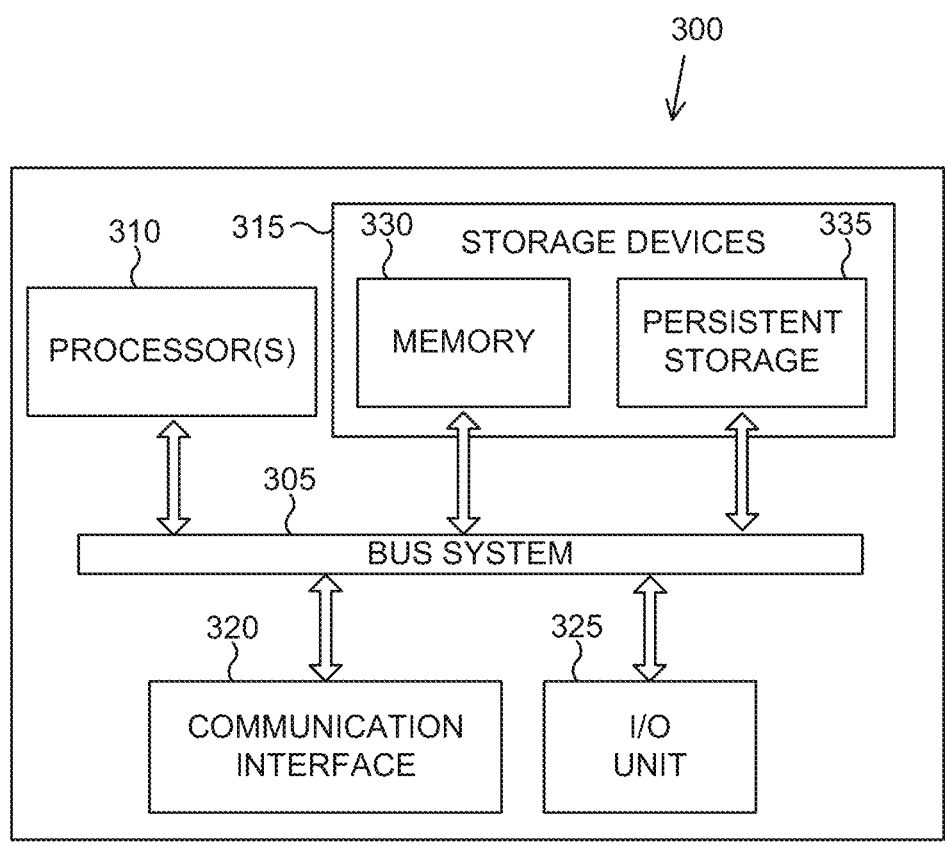
FIG. 3 illustrates an exemplary electronic device for communicating in the networked computing system according to various embodiments of this disclosure.

FIG. 3 illustrates an exemplary electronic device for communicating in the networked computing system according to various embodiments of this disclosure. In one embodiment, the electronic device 300 is a user equipment implemented as a mobile device, which can represent one of the UEs in FIG. 1.

As shown in FIG. 3, the electronic device 300 includes a bus system 305, which supports communication between at least one processing device 310, at least one storage device 315, at least one communications unit 320, and at least one input/output (I/O) unit 325.

The processing device 310 executes instructions that may be loaded into a memory 330. The processing device 310 may include any suitable number(s) and type(s) of processors or other devices in any suitable arrangement. Example types of processing devices 310 include microprocessors, microcontrollers, digital signal processors, field programmable gate arrays, application specific integrated circuits, and discreet circuitry.

The memory 330 and a persistent storage 335 are examples of storage devices 315, which represent any structure(s) capable of storing and facilitating retrieval of information (such as data, program code, and/or other suitable information on a temporary or permanent basis). The memory 330 may represent a random access memory or any other suitable volatile or non-volatile storage device(s). The persistent storage 335 may contain one or more components or devices supporting longer-term storage of data, such as a ready only memory, hard drive, Flash memory, or optical disc.

The communications unit 320 supports communications with other systems or devices. For example, the communications unit 320 could include a network interface card or a wireless transceiver facilitating communications over the network 130. The communications unit 320 may support communications through any suitable physical or wireless communication link(s).

The I/O unit 325 allows for input and output of data. For example, the I/O unit 325 may provide a connection for user input through a keyboard, mouse, keypad, touchscreen, or other suitable input device. The I/O unit 325 may also send output to a display, printer, or other suitable output device.

As described in more detail below, the electronic device 300 can serve as a shared spectrum manager in a networked computing system can generate synchronization source/slave assignments and configure synchronization signals.

Although FIG. 3 illustrates an example of an electronic device 300 in a wireless system including a plurality of base stations, such as base stations 101, 102, and 103 in FIG. 1, various changes may be made to FIG. 3. For example, various components in FIG. 3 can be combined, further subdivided, or omitted and additional components could be added according to particular needs. In addition, as with computing and communication networks, servers can come in a wide variety of configurations, and FIG. 3 does not limit this disclosure to any particular electronic device.

One embodiment relates to operation of multi-value Doppler pre-compensation in a LEO satellite system, although the operation may also be applied to other wireless communication systems. It should not be interpreted as a limiting factor of the scope of this disclosure. This embodiment of multi-value Doppler pre-compensation in the LEO satellite system includes operations for initial access procedure, cell reselection for idle UEs, downlink data reception and handover for connected UEs.

Multi-Value Doppler Pre-Compensation for Initial Access Procedure

Figure 4:
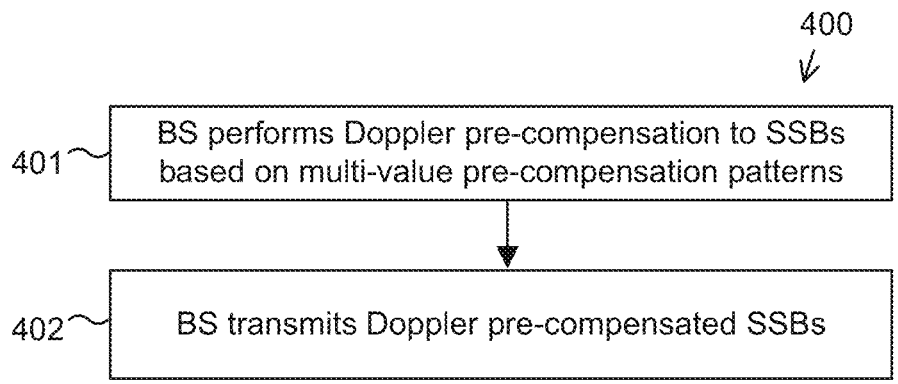
FIG. 4 illustrates a flowchart for an example of BS operations for initial access procedure according to embodiments of the present disclosure.

FIG. 4 illustrates a flowchart for an example of BS operations for initial access procedure according to embodiments of the present disclosure. The method 400 depicted in FIG. 4 is for illustration only. Other embodiments could be used without departing from the scope of this disclosure.

FIG. 4 illustrates an exemplary operation flow 400 at the BS and the BS's transmission to the UE. At operation 401, the BS, for example the LEO satellite, may apply multi-value Doppler pre-compensation to different sets of SSBs. One example for a BS to perform Doppler pre-compensation is that the BS applies phase rotation with rotation rates determined by, for example, a frequency that represents a Doppler shift value to the time domain waveform before downlink transmission. At operation 402, the BS broadcasts the multi-value Doppler pre-compensated SSBs to the UEs.

Figure 5:
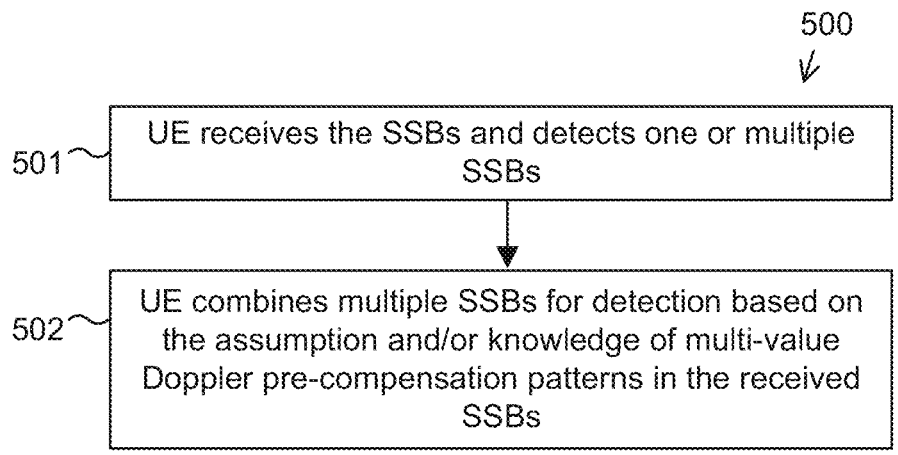
FIG. 5 illustrates a flowchart for an example of UE operations for initial access procedure according to embodiments of the present disclosure.

FIG. 5 illustrates a flowchart for an example of UE operations for initial access procedure according to embodiments of the present disclosure. The method 500 depicted in FIG. 5 is for illustration only. Other embodiments could be used without departing from the scope of this disclosure.

FIG. 5 illustrates an exemplary operation flow 500 at the UE and the UE's reception from the BS. At operation 501, the UE, for example a UE in an initial access procedure, may receive SSBs broadcast by the BS. At operation 502, the UE may try to detect one or multiple SSBs to get synchronized and access to the network. For multiple SSB detection, the UE may combine multiple SSBs to improve the detection performance, such as accuracy for timing synchronization, frequency offset (FO) estimation, and reference signal received power (RSRP) measurement.

Depending on factors such as the satellite's spot beam/cell size, as well as the satellite's altitude and relative movement speed to the earth surface, the BS/satellite may determine the number of different Doppler values for pre-compensation operations. For example, for a LEO satellite system with 2 giga-Hertz (GHz) carrier frequency, and the satellite's altitude of 600 kilometers (km), speed of 7.65 kilometers per second (km/s), and spot beam diameter of 600 km, two UEs on the two opposite edges of the spot beam right under the satellite would see a Doppler shift difference of 48 kilo-Hertz (kHz)—i.e., ±24 kHz, or 12 parts per million (ppm), for the two UEs respectively. In case that a UE expects a Doppler shift variation range of 10 ppm to handle synchronization in the initial access procedure, a beam-center-targeting single-value Doppler pre-compensation (i.e., 0 Hz in this example) would not be able to sufficiently reduce the Doppler shifts for the two UEs to get synchronized and access to the network. For multi-value Doppler pre-compensation, the BS may apply different Doppler shifts for signal pre-compensation before transmission. In the above system deployment example, the BS may apply a Doppler shift of +12 kHz to half of the SSBs and a Doppler shift of −12 kHz to the other half for pre-compensation, so that all the UEs inside of the spot beam may be able to get synchronized and access to the network through either half of SSB detection.

In addition, considering that a UE may assume that synchronization signal and physical broadcast channel (SS/PBCH) blocks (or SSBs) occur with a periodicity of 2 frames for initial cell selection [3], let i denote the index of system frame number (SFN) starting from 0 to 1023, and k=[i/2]. The number of Doppler shift values for pre-compensation to SS/PBCH blocks (or SSBs), $N_{Doppler}$, and the number of SS/PBCH blocks (or SSBs) pre-compensated by the identical Doppler shift value, $N_{identical}$, are determined by the number of SS/PBCH blocks (or SSBs), $N_{SSB}$, within two, k-th and (k+1)-th, frames, and satisfy $$N_{SSB} = N_{Doppler} \times N_{identical},$$

where $N_{SSB}$, $N_{Doppler}$ and $N_{identical}$ are integer numbers.

The $N_{SSB}$ SS/PBCH blocks (or SSBs) in the k-th and (k+1)-th frames are indexed from 0 to $N_{SSB}-1$, where index 0 corresponds to the first SS/PBCH block (or SSBs) in the two frames. The $N_{Doppler}$ Doppler shift values for pre-compensation are sorted in ascending order and indexed from 0 to $N_{Doppler}-1$, where index 0 corresponds to the first of the set of Doppler shift values. The pre-compensation patterns are determined as follows:

Class A: The l-th Doppler shift value is applied to $(l \cdot N_{Doppler})$-th SS/PBCH blocks (or SSBs), where n=0, 1, . . . , $N_{identical}-1$, in the two, k-th and (k+1)-th, frames.

Class B: The l-th Doppler shift value is applied to from $(l \cdot N_{Doppler})$-th to $[(l+1) \cdot N\_Doppler-1]$-th SS/PBCH blocks (or SSBs) in the two, k-th and (k+1)-th, frames.

Figure 6:
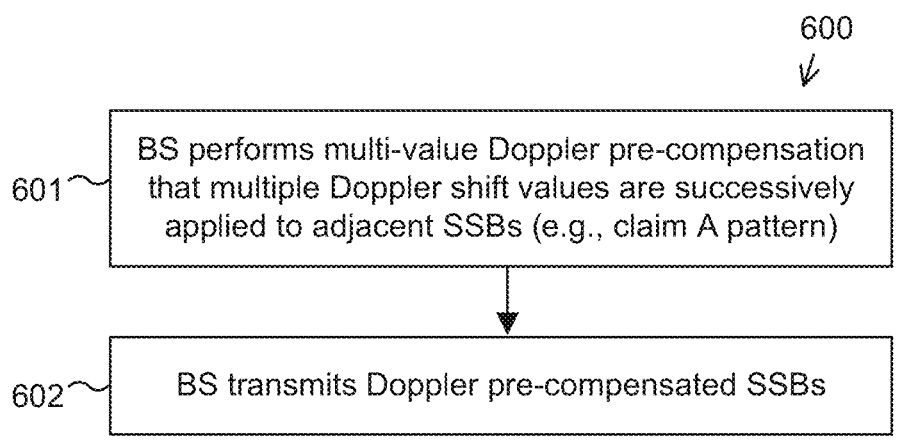
FIG. 6 illustrates a flowchart for an example of BS operations for initial access procedure according to embodiments of the present disclosure.

For the Class A pattern, the multiple Doppler shift values may be successively applied to adjacent SSBs for pre-compensation, as shown in FIG. 5 and FIG. 6. In case that a UE is able to be aware of the frequency difference in the two adjacent SSBs, the UE may try to rotate the phase of one or two SSB(s) to align with each other, and then combine the two to achieve better SSB detection performance, such as accuracy for timing synchronization, FO estimation, and RSRP measurement.

FIG. 6 illustrates a flowchart for an example of BS operations for initial access procedure according to embodiments of the present disclosure. The method 600 depicted in FIG. 6 is for illustration only. Other embodiments could be used without departing from the scope of this disclosure.

FIG. 6 illustrates an exemplary operation flow 600 at the BS and the BS's transmission to the UE. At operation 601, the BS, for example the LEO satellite, may apply multi-value Doppler pre-compensation to different sets of SSBs. One example for a BS to perform Doppler pre-compensation is that the BS applies phase rotation with a rotation rates determined by, for example, a frequency that represents a Doppler shift value to the time domain waveform before downlink transmission. For multi-value Doppler pre-compensation, multiple Doppler shift values may be successively applied to adjacent SSBs for pre-compensation (e.g., class A pattern). At operation 602, the BS broadcasts the multi-value Doppler pre-compensated SSBs to the UEs.

Figure 7:
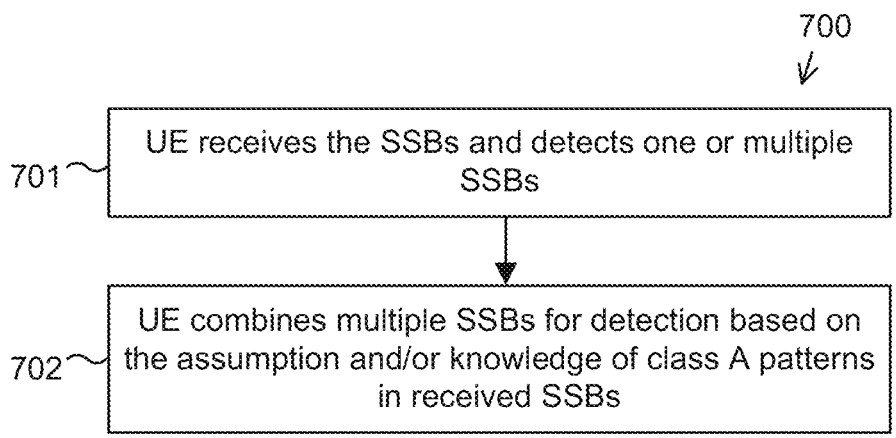
FIG. 7 illustrates a flowchart for an example of UE operations for initial access procedure according to embodiments of the present disclosure.

FIG. 7 illustrates a flowchart for an example of UE operations for initial access procedure according to embodiments of the present disclosure. The method 700 depicted in FIG. 7 is for illustration only. Other embodiments could be used without departing from the scope of this disclosure.

FIG. 7 illustrates an exemplary operation flow 700 at the UE and the UE's reception from the BS. At operation 701, the UE, for example a UE in initial access procedure, may receive SSBs broadcast by the BS. At operation 702, the UE may assume and/or have the knowledge of the multi-value Doppler pre-compensation patterns, such as the class A pattern, and try to detect multiple SSBs to get synchronized and access to the network. For example, the UE may try to evaluate the frequency difference in the two adjacent SSBs, and then try to rotate the phase of one or two SSB(s) to align with each other, and then combine the two to achieve better SSB detection performance, such as accuracy for timing synchronization, FO estimation, and RSRP measurement.

For Class B pattern, one out of the multiple Doppler shift values may be applied to a number of continuous SSBs. In case that a UE is able to be aware of Class B being applied to SSBs, the UE may try to combine two or more continuous SSBs to achieve better SSB detection performance, such as accuracy for timing synchronization, FO estimation, and RSRP measurement.

Figure 8:
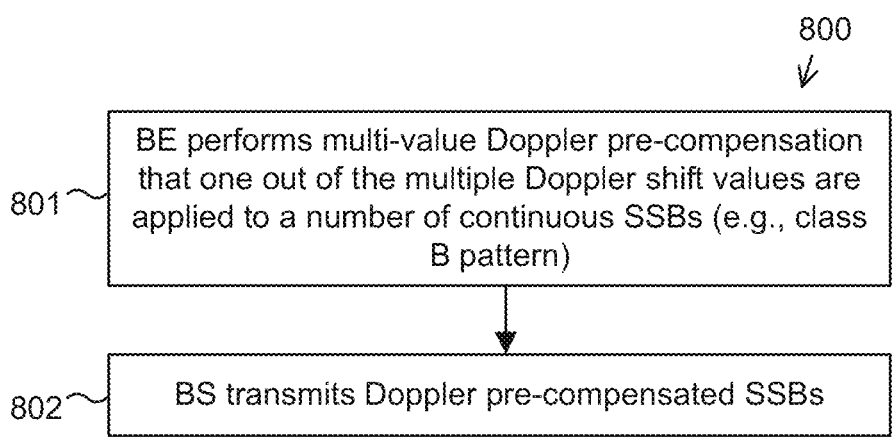
FIG. 8 illustrates a flowchart for an example of BS operations for initial access procedure according to embodiments of the present disclosure.

FIG. 8 illustrates a flowchart for an example of BS operations for initial access procedure according to embodiments of the present disclosure. The method 800 depicted in FIG. 8 is for illustration only. Other embodiments could be used without departing from the scope of this disclosure.

FIG. 8 illustrates an exemplary operation flow 800 at the BS and the BS's transmission to the UE. At operation 801, the BS, for example the LEO satellite, may apply multi-value Doppler pre-compensation to different sets of SSBs. One example for a BS to perform Doppler pre-compensation is that the BS applies phase rotation with a rotation rate determined by, for example, a frequency that represents a Doppler shift value to the time domain waveform before downlink transmission. For multi-value Doppler pre-compensation, one out of the multiple Doppler shift values may be applied to a number of continuous SSBs for pre-compensation (e.g., class B pattern). At operation 802, the BS broadcasts the multi-value Doppler pre-compensated SSBs to the UEs.

Figure 9:
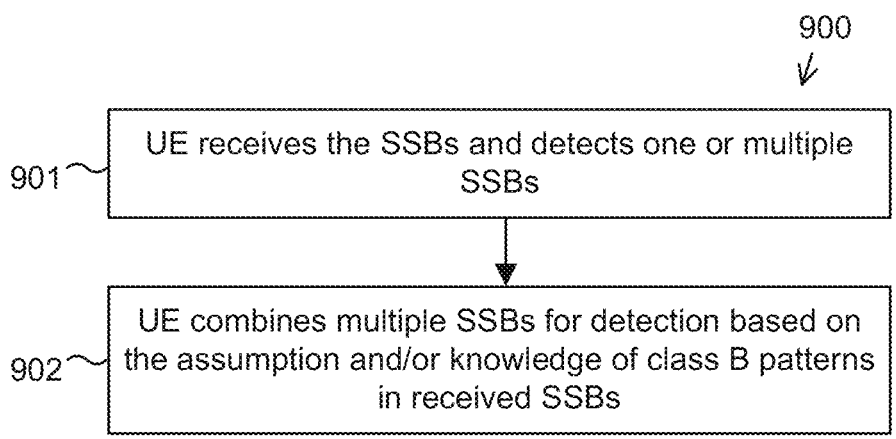
FIG. 9 illustrates a flowchart for an example of UE operations for initial access procedure according to embodiments of the present disclosure.

FIG. 9 illustrates a flowchart for an example of UE operations for initial access procedure according to embodiments of the present disclosure. The method 900 depicted in FIG. 9 is for illustration only. Other embodiments could be used without departing from the scope of this disclosure.

FIG. 9 illustrates an exemplary operation flow 900 at the UE and the UE's reception from the BS according to embodiments of the present disclosure. At operation 901, the UE, for example a UE in initial access procedure, may receive SSBs broadcast by the BS. At operation 902, the UE may assume and/or have the knowledge of the multi-value Doppler pre-compensation patterns, such as the class B pattern, and try to detect multiple SSBs to get synchronized and access to the network. For example, the UE may try to combine two or more continuous SSBs to achieve better SSB detection performance, such as accuracy for timing synchronization, FO estimation, and RSRP measurement.

FIGS. 10A-10B illustrate examples for 2-Doppler pre-compensation SSB patterns (class A) according to embodiments of the present disclosure. The examples 1000 and 1010 depicted in FIGS. 10A-10B is for illustration only. Other embodiments could be used without departing from the scope of this disclosure.

FIGS. 10A-10B plot the examples for 2-Doppler pre-compensation SSB patterns (class A) for different SSB periodicities and four SSBs in each SSB burst set. FIGS. 10A and 10B are for SSB-periodicity of 20 milliseconds (ms) and 10 ms, respectively. The two Doppler shift values (D1 and D2) are alternatively applied to adjacent SSBs in the 2-frame time period.

FIG. 11 illustrates an example for 8-Doppler pre-compensation SSB patterns (class A) according to embodiments of the present disclosure. The example 1100 depicted in FIG. 11 is for illustration only. Other embodiments could be used without departing from the scope of this disclosure.

FIG. 11 plots the example for 8-Doppler pre-compensation SSB patterns (class A) for SSB periodicity of 10 ms and four SSBs in each SSB burst set. The eight Doppler shift values are successively applied to eight continuous SSBs in the 2-frame time period.

FIGS. 12A-12B illustrate examples for multi-Doppler pre-compensation SSB patterns (class B) according to embodiments of the present disclosure. The examples 1200 and 1210 depicted in FIGS. 12A-12B is for illustration only. Other embodiments could be used without departing from the scope of this disclosure.

FIGS. 12A and 12B plot examples for multi-Doppler pre-compensation SSB patterns (class B) for different SSB periodicities and four SSBs in each SSB burst set. FIG. 12A is for SSB-periodicity of 20 ms and 2-Doppler pre-compensation, where one out of the two Doppler shift values is applied to two continuous SSBs. FIG. 12B is for SSB-periodicity of 5 ms and 8-Doppler pre-compensation, where one out of the eight Doppler shift values is applied to two continuous SSBs in the 2-frame time period.

For example, taking into account of the multi-value Doppler pre-compensation's impact on baseband waveform, the time-continuous signal $\bar{s}_l^{(p,\mu)}(t)$ on antenna port p and subcarrier spacing configuration $\mu$ for OFDM symbol $l \in \{0, 1, \ldots, N_{slot}^{subframe,\mu} N_{symb}^{slot} - 1\}$ in a subframe for any physical channel or signal except the physical random access channel (PRACH) is defined by $$s_l^{(p,\mu)}(t) = \begin{cases} e^{j \cdot 2\pi \cdot f_{Doppler}^n \cdot t} \cdot \bar{s}_l^{(p,\mu)}(t) & t_{start,l}^\mu \le t < t_{start,l}^\mu + T_{symb,l}^\mu \\ 0 & \text{otherwise} \end{cases}$$

$$\bar{s}_l^{(p,\mu)}(t) = \sum_{k=0}^{N_{grid,x}^{size,\mu} N_{sc}^{RB} - 1} a_{k,l}^{(p,\mu)} e^{j 2\pi (k + k_0^\mu - N_{grid,x}^{size,\mu} N_{sc}^{RB}/2) \Delta f (t - N_{CP,l}^\mu T_c - t_{start,l}^\mu)}$$

$$k_0^\mu = (N_{grid,x}^{start,\mu} + N_{grid,x}^{size,\mu}/2) N_{sc}^{RB} - (N_{grid,x}^{start,\mu_0} + N_{grid,x}^{size,\mu_0}/2) N_{sc}^{RB} 2^{\mu_0 - \mu}$$

$$T_{symb,l}^\mu = (N_u^\mu + N_{CP,l}^\mu) T_c$$

where t=0 at the start of the subframe, $$N_u^\mu = 2048\kappa \cdot 2^{-\mu}$$

$$N_{CP,l}^\mu = \begin{cases} 512\kappa \cdot 2^{-\mu} \\ 144\kappa \cdot 2^{-\mu} + 16\kappa \\ 144\kappa \cdot 2^{-\mu} \end{cases}$$

extended cyclic prefix
normal cyclic prefix, l=0 or l=7·2$^\mu$
normal cyclic prefix, l≠0 and l≠7·2$^\mu$
and $f_{Doppler}^n$ is the frequency, or phase rotation rate, that represents the Doppler shift value for pre-compensation, which is applied to the time domain waveform before downlink transmission;

$\Delta f$ is given by clause 4.2 in [4];

$\mu$ is the subcarrier spacing configuration;

$\mu_0$ is the largest $\mu$ value among the subcarrier spacing configurations by the higher-layer parameter scs-SpecificCarrierList.

For multi-value Doppler pre-compensation, $f_{Doppler}^n$ is the n-th frequency value in the set of Doppler shift values for pre-compensation.

Multi-Value Doppler Pre-Compensation for Idle UE Cell Reselection

Figure 13:
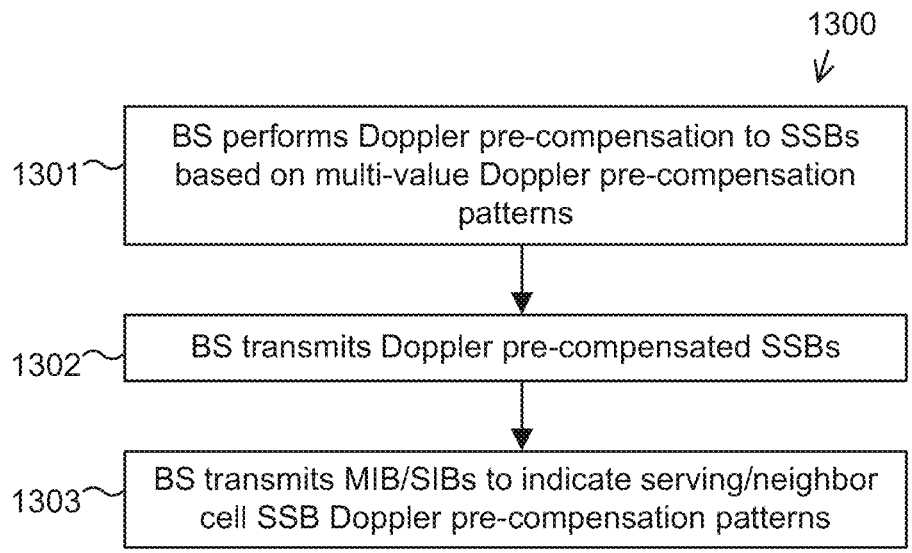
FIG. 13 illustrates a flowchart for an example of BS operations according to embodiments of the present disclosure.

FIG. 13 illustrates a flowchart for an example of BS operations according to embodiments of the present disclosure. The method 1300 depicted in FIG. 13 is for illustration only. Other embodiments could be used without departing from the scope of this disclosure.

FIG. 13 illustrates an exemplary operation flow 1300 at the BS and the BS's transmission to the UE. At operation 1301, the BS, for example the LEO satellite, may apply multi-value Doppler pre-compensation to different sets of SSBs, similar to operation 401, according to certain multi-value Doppler pre-compensation patterns, class A and/or class B as shown in the examples of FIGS. 10A-10B to FIG. 12. One example for a BS performing Doppler pre-compensation is that the BS applies phase rotation with a rotation rates determined by, for example, a frequency that represents a Doppler shift value to the time domain waveform before downlink transmission. At operation 1302, the BS broadcasts the multi-value Doppler pre-compensated SSBs to the UEs, similar to operation 402. At operation 1303, the BS broadcasts the system information blocks, including the multi-value Doppler pre-compensation patterns. The information regarding if single-value or multi-value Doppler pre-compensation being applied and/or the multi-value Doppler pre-compensation patterns may be broadcast in system information blocks, including master information block (MIB) and/or system information blocks (SIBs).

For example, although other system information blocks including the MIB and/or other SIBs may also be used for this purpose, such information for a serving cell may be broadcast in system information block type 1 (SIB1) defined using Abstract Syntax Notation One (ASN.1) as follows (emphasis added):

For Class A:

```
SIB1:
ServingCellConfigCommonSIB ::=           SEQUENCE {
    downlinkConfigCommon                     DownlinkConfigCommonSIB,
    uplinkConfigCommon                       UplinkConfigCommonSIB
OPTIONAL,  -- Need R
    supplementaryUplink                      UplinkConfigCommonSIB
OPTIONAL,  -- Need R
    n-TimingAdvanceOffset                    ENUMERATED { n0, n25560, n39936
    }
OPTIONAL,  -- Need S
    ssb-PositionsInBurst                     SEQUENCE {
        inOneGroup                           BIT STRING (SIZE (8)),
        groupPresence                        BIT STRING (SIZE (8))
OPTIONAL   -- Cond Above6GHzOnly
    },
    ssb-PeriodicityServingCell               ENUMERATED {ms5, ms10, ms20,
        ms40, ms80, ms 160},
    ssb-MultiDoppler                         BOOLEAN
OPTIONAL,  -- Need R
    ssb-NrofDopplerShift                     INTEGER (1..maxNrofDopplerShift)
OPTIONAL,  -- Need R
    ssb-DopplerDiffKHz                       INTEGER (1..maxDopplerDiffKHz)
OPTIONAL,  --Need R
    tdd-UL-DL-ConfigurationCommon            TDD-UL-DL-ConfigCommon
OPTIONAL,  -- Cond TDD
    ss-PBCH-BlockPower                       INTEGER (-60..50),
    ...
}
``` where "ssb-MultiDoppler" indicates if single-value or multi-value Doppler pre-compensation is being applied, "ssb-NrofDopplerShift" indicates the number of Doppler shift values for pre-compensation, and "ssb-DopplerDiffKHz" indicates the difference in KHz of Doppler shifts between two adjacent SSBs.

For Class B:

```
SIB1:
ServingCellConfigCommonSIB ::=           SEQUENCE {
    downlinkConfigCommon                     ,DownlinkConfigCommonSIB
    uplinkConfigCommon                       UplinkConfigCommonSIB
OPTIONAL,  -- Need R
    supplementaryUplink                      UplinkConfigCommonSIB
        OPTIONAL,  -- Need R
    n-TimingAdvanceOffset                    ENUMERATED { n0, n25560, n39936
    }
OPTIONAL,  -- Need S
    ssb-PositionsInBurst                     SEQUENCE {
        inOneGroup                           BIT STRING (SIZE (8)) ,
        groupPresence                        BIT STRING (SIZE (8))
OPTIONAL   -- Cond Above6GHzOnly
    },
```

-continued

```
    ssb-PeriodicityServingCell          ENUMERATED {ms5, ms10, ms20,
        ms40, ms80, ms160},
    ssb-MultiDoppler                    BOOLEAN
OPTIONAL,   -- Need R
    ssb-NrofDopplerShift                INTEGER (1..maxNrofDopplerShift)
OPTIONAL,   --Need R
    ssb-NrofIdenticalDoppler            INTEGER
        (1..maxNrofIdenticalDoppler)
OPTIONAL,   -- Need R
    tdd-UL-DL-ConfigurationCommon       TDD-UL-DL-ConfigCommon
OPTIONAL,   -- Cond TDD
    ss-PBCH-BlockPower                  INTEGER (-60..50),
    ...
}
``` where "ssb-MultiDoppler" to indicate if single-value or multi-value Doppler pre-compensation being applied, "ssb-NrofDopplerShift" to indicate the number of Doppler shift values for pre-compensation, "ssb-NrofIdenticalDoppler" to indicate the number of SSBs pre-compensated by the identical Doppler shift value.

Besides SIB1, other system information blocks including the MIB and/or other SIBs may also be used for broadcasting information regarding if single-value or multi-value Doppler pre-compensation being applied, and/or the multi-value Doppler pre-compensation patterns. For example, such information for intra-frequency neighboring cell may be broadcast in SIBS, although other system information blocks may also be used for this purpose, as follows (emphasis added):

For Class A:

```
SIB3 ::=                                SEQUENCE {
    intraFreqNeighCellList              IntraFreqNeighCellList
OPTIONAL,   -- Need R
    intraFreqNeighCell-MultiDoppler     BOOLEAN
OPTIONAL,   -- Need R
    intraFreqNeighCell-NrofDopplerShift INTEGER (1..maxNrofDopplerShift)
OPTIONAL,   -- Need R
    intraFreqNeighCell-DopplerDiffKHz   INTEGER (1..maxDopplerDiffKHz)
OPTIONAL,   -- Need R
    intraFreqBlackCellList              IntraFreqBlackCellList
OPTIONAL,   -- Need R
    lateNonCriticalExtension            OCTET STRING
        OPTIONAL,
    ...
}
```

For class B:

```
SIB3 ::=                                SEQUENCE {
    intraFreqNeighCellList              IntraFreqNeighCellList
OPTIONAL,   -- Need R
    intraFreqNeighCell-MultiDoppler     BOOLEAN
OPTIONAL,   -- Need R
    intraFreqNeighCell-NrofDopplerShift INTEGER
        (1..maxNrofDopplerShift)
OPTIONAL,   --Need R
    intraFreqNeighCell-NrofIdenticalDoppler  INTEGER
        (1..maxNrofIdenticalDoppler)
OPTIONAL,   -- Need R
    intraFreqBlackCellList              IntraFreqBlackCellList
OPTIONAL,   -- Need R
    lateNonCriticalExtension            OCTET STRING
OPTIONAL,
    ...
}
```

In an another example, such information regarding if single-value or multi-value Doppler pre-compensation being applied and/or the multi-value Doppler pre-compensation patterns may be broadcast in SIB4 for inter-frequency neighboring cell, although other system information blocks including MIB and/or other SIBs may also be used for this purpose, as follows (emphasis added):
For Class A:

```
SIB4 ::=                                  SEQUENCE {
...
    interFreqNeighCellList               IntraFreqNeighCellList
OPTIONAL,   -- Need R
    interFreqNeighCell-MultiDoppler      BOOLEAN
OPTIONAL,   -- Need R
    interFreqNeighCell-NrofDopplerShift  INTEGER (1..maxNrofDopplerShift)
OPTIONAL,   -- Need R
    interFreqNeighCell-DopplerDiffKHz    INTEGER (1..maxDopplerDiffKHz)
OPTIONAL,   -- Need R
    interFreqBlackCellList               IntraFreqBlackCellList
OPTIONAL,   -- Need R
...
}
```

For class B:

```
SIB4 ::=                                  SEQUENCE {
...
    interFreqNeighCellList               IntraFreqNeighCellList
OPTIONAL,   -- Need R
    interFreqNeighCell-MultiDoppler      BOOLEAN
OPTIONAL,   -- Need R
    interFreqNeighCell-NrofDopplerShift  INTEGER (1..maxNrofDopplerShift)
OPTIONAL,   -- Need R
    interFreqNeighCell-NrofIdenticalDoppler   INTEGER
        (1..maxNrofIdenticalDoppler)
OPTIONAL,   -- Need R
    interFreqBlackCellList               IntraFreqBlackCellList
OPTIONAL,   -- Need R
    ...
}
```

Figure 14:
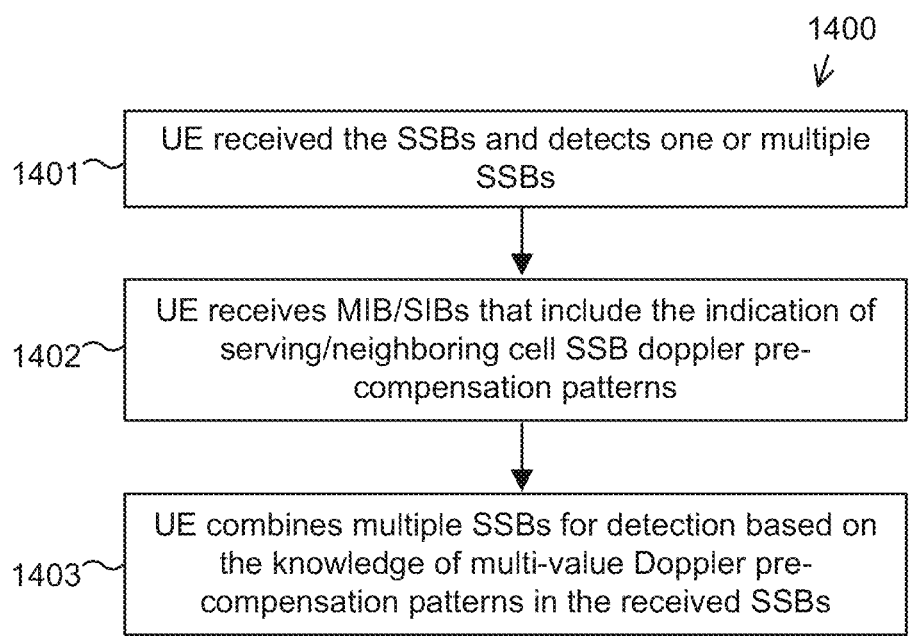
FIG. 14 illustrates a flowchart for an example of UE operations according to embodiments of the present disclosure.

FIG. 14 illustrates a flowchart for an example of UE operations according to embodiments of the present disclosure. The method 1400 depicted in FIG. 14 is for illustration only. Other embodiments could be used without departing from the scope of this disclosure.

FIG. 14 illustrates an exemplary operation flow 1400 at the UE. At operation 1401, the UE receives the SSBs and detects one or multiple SSBs. These SSBs may have been Doppler pre-compensated by the BS. At operation 1402, the UE receives system information blocks, for example, the MIB and/or SIBs, which include the information of serving/neighboring cells' single-value and/or multi-value Doppler pre-compensation parameters. At operation 1403, based on knowledge of the Doppler pre-compensation pattern, the UE may accordingly combine multiple SSBs in the time domain to improve timing synchronization, FO estimation and RSRP measurement performance. For example, the information of multi-value Doppler pre-compensation pattern may be utilized by idle and/or inactive UEs to perform SSB combining in order to improve SSB detection performance including timing synchronization and FO estimation, as well as RSRP measurement performance, for cell reselection.
Multi-Value Doppler Pre-Compensation for Connected UE Data Channel Reception and Handover In case of multi-value Doppler pre-compensation, where different sets of SSBs are pre-compensated by different Doppler shift values, for the physical downlink control channel (PDCCH), physical downlink shared channel (PDSCH) and downlink reference signals, such as channel state information reference signal (CSI-RS), the BS may apply the same Doppler shift pre-compensation as the set of SSBs through which a UE gets synchronized and access to the network.

FIG. 15 illustrates an exemplary scheduling operation of 2-value Doppler pre-compensation according to embodiments of the present disclosure. The method 1500 depicted in FIG. 15 is for illustration only. Other embodiments could be used without departing from the scope of this disclosure.

FIG. 15 illustrates a diagram for an exemplary 2-value Doppler pre-compensation and an associated scheduling operation including SSBs, SIBS, radio resource control (RRC) messages, CSI-RSs, PDCCHs and PDSCHs. For the two Doppler shift values for pre-compensation, namely "Doppler-value 1" and "Doppler-value 2":

The OFDM symbols for DL transmission may be divided into two Doppler pre-compensation groups in time division manner: Group 1 (white blocks) are pre-compensated by "Doppler-value 1"; and Group 2 (shaded blocks) are pre-compensated by "Doppler-value 2."

UEs, such as UEs in connected mode that get synchronized and access to the network through "SSBs with Doppler-value 1," may be scheduled by the BS in Group 1 for DL transmission, including RRC messages, PDCCHs, PDSCHs and other DL reference signals, such as CSI-RS. In addition, UEs may tune its local oscillator according to the FO estimation based on "SSBs with Doppler-value 1," and then keep tracking the FO changes based on other DL reference signals, such as CSI-RS.

In case of different DL reference signals and channels to be scheduled in the same OFDM symbols, for example, SSB/PDSCH/CSI-RS/DMRS/PDCCH, those reference signals and channels need to be in the same Doppler pre-compensation group.

In case of handover for connected UEs, the UE may utilize the information of multi-value Doppler pre-compensation patterns that are broadcast by system information blocks including MIB and/or SIBS, as shown in the example of FIG. 13, to combine multiple SSBs in order to improve SSB detection performance including timing synchronization and FO estimation, as well as RSRP measurement performance, for handover process.

Figure 16:
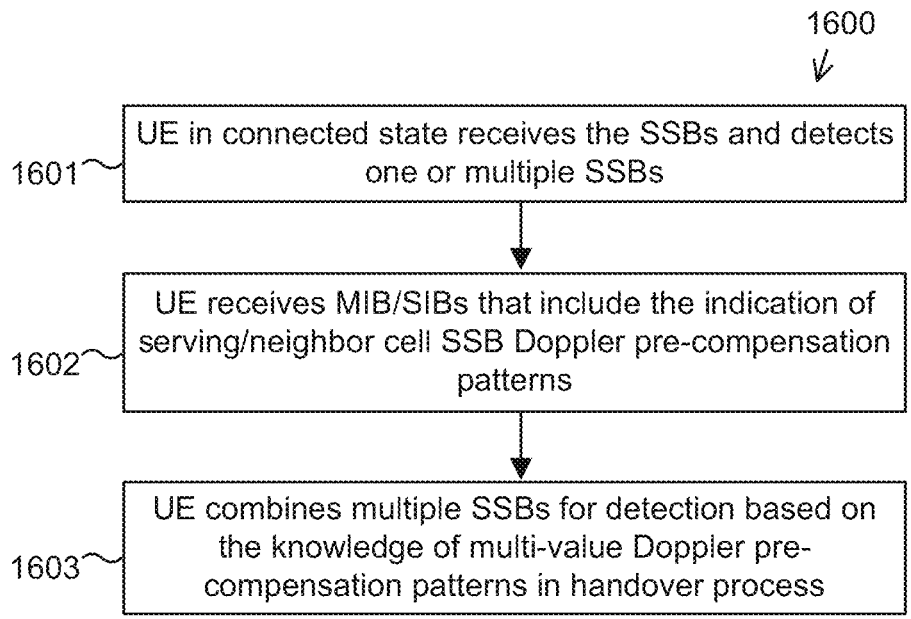
FIG. 16 illustrates a flowchart for an example of UE operations according to embodiments of the present disclosure.

FIG. 16 illustrates a flowchart for an example of UE operations according to embodiments of the present disclosure. The method 1600 depicted in FIG. 16 is for illustration only. Other embodiments could be used without departing from the scope of this disclosure.

FIG. 16 illustrates an exemplary operation flow 1600 at the UE in the connected state. At operation 1601, the UE receives the SSBs and detect one or multiple SSBs. These SSBs may have been Doppler pre-compensated by the BS. At operation 1602, the UE receives system information blocks, for example, the MIB and/or SIBS, which include the information of serving/neighboring cells' single-value and/or multi-value Doppler pre-compensation parameters. At operation 1603, based on knowledge of the Doppler pre-compensation pattern, the UE may accordingly combine multiple SSBs in the time domain to improve timing synchronization, FO estimation and RSRP measurement performance. For example, the information of multi-value Doppler pre-compensation pattern may be utilized by UEs in the connected state to perform SSB combining in order to improve SSB detection performance including timing synchronization and FO estimation, as well as RSRP measurement performance, for handover process.

Figure 17:
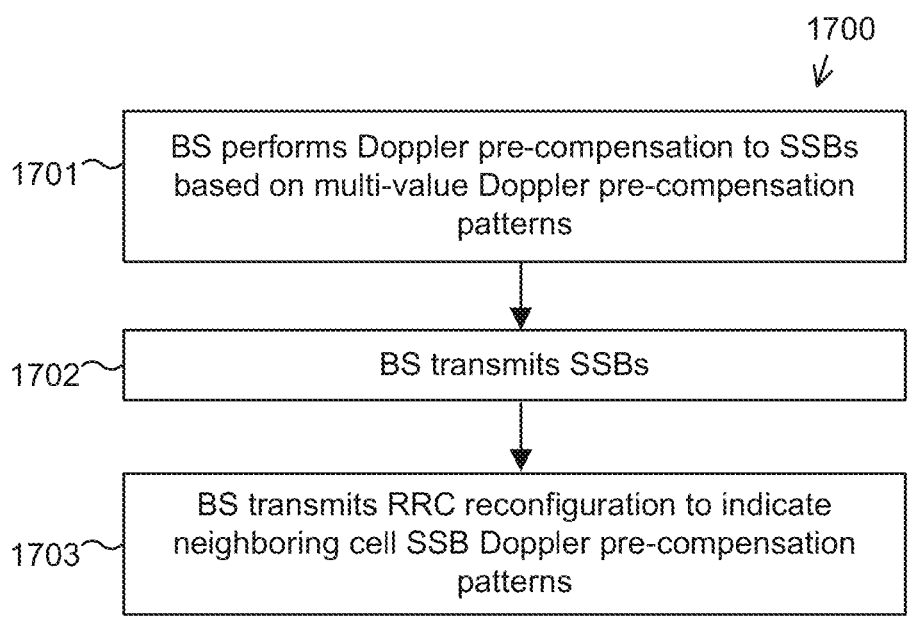
FIG. 17 illustrates a flowchart for an example of BS operations according to embodiments of the present disclosure.

FIG. 17 illustrates a flowchart for an example of BS operations according to embodiments of the present disclosure. The method 1700 depicted in FIG. 17 is for illustration only. Other embodiments could be used without departing from the scope of this disclosure.

FIG. 17 illustrates an exemplary operation flow 1700 at the BS and the BS's transmission to the UE. At operation 1701, the BS, for example the LEO satellite, may apply multi-value Doppler pre-compensation to different sets of SSBs, similar to operation 401, according to certain multi-value Doppler pre-compensation patterns, class A and/or class B as shown in the examples of FIGS. 10A-10B to FIG. 12. One example for a BS to perform Doppler pre-compensation is that the BS applies phase rotation with a rotation rates determined by, for example, a frequency that represents a Doppler shift value to the time domain waveform before downlink transmission. At operation 1702, the BS broadcasts the multi-value Doppler pre-compensated SSBs to the UEs, similar to operation 402. At operation 1703, the BS transmits the RRC reconfiguration message to the UE [5], including the multi-value Doppler pre-compensation patterns, such as in a scenario of handover for UEs in connected mode.

For example, information may include if the same Doppler pre-compensation pattern being applied before and after handover, and/or the multi-value Doppler pre-compensation patterns of the target neighboring cell for the UE to measure and handover to. Such information may be conveyed by RRC reconfiguration message as follows (emphasis added):

For Class A:

```
RRCReconfiguration-IEs ::=           SEQUENCE {
    radioBearerConfig                    RadioBearerConfig
    OPTIONAL, -- Need M
    secondaryCellGroup                   OCTET STRING (CONTAINING
        CellGroupConfig)
    OPTIONAL, -- Need M
    measConfig                           MeasConfig
    OPTIONAL, -- Need M
    lateNonCriticalExtension             OCTET STRING
    OPTIONAL,
    nonCriticalExtension                 SEQUENCE { }
    OPTIONAL
}
MeasConfig ::= SEQUENCE {
    measObjectToRemoveList               MeasObjectToRemoveList
    OPTIONAL, -- Need N
    measObjectToAddModList               MeasObjectToAddModList
    OPTIONAL, -- Need N
    reportConfigToRemoveList             ReportConfigToRemoveList
    OPTIONAL, -- Need N
    reportConfigToAddModList             ReportConfigToAddModList
    OPTIONAL, -- Need N
    measIdToRemoveList                   MeasIdToRemoveList
    OPTIONAL, -- Need N
    measIdToAddModList                   MeasIdToAddModList
    OPTIONAL, -- Need N
    s-MeasureConfig CHOICE {
        ssb-RSRP RSRP-Range,
        csi-RSRP RSRP-Range
    }
    OPTIONAL, -- Need M
    ssb-IdenticalPattern                 BOOLEAN
    OPTIONAL, -- Need R
    ssb-NrofDopplerShift                 INTEGER (1..maxNrofDopplerShift)
```

-continued

```
OPTIONAL, -- Need R
    ssb-DopplerDiffKHz          INTEGER (1..maxDopplerDiffKHz)
OPTIONAL, -- Need R
quantityConfig                  QuantityConfig
OPTIONAL, -- Need M
    measGapConfig               MeasGapConfig
OPTIONAL, -- Need M
    measGapSharingConfig        MeasGapSharingConfig
OPTIONAL, -- Need M
    ...
}
```

For Class B:

```
RRCReconfiguration-IEs ::=      SEQUENCE {
radioBearerConfig                   RadioBearerConfig
OPTIONAL, -- Need M
secondaryCellGroup                  OCTET STRING (CONTAINING
CellGroupConfig)
OPTIONAL, -- Need M
measConfig                              MeasConfig
OPTIONAL, -- Need M
lateNonCriticalExtension            OCTET STRING
OPTIONAL,
nonCriticalExtension                    SEQUENCE { }
OPTIONAL
}
MeasConfig ::= SEQUENCE {
    measObjectToRemoveList      MeasObjectToRemoveList
OPTIONAL, -- Need N
    measObjectToAddModList      MeasObjectToAddModList
OPTIONAL, -- Need N
    reportConfigToRemoveList    ReportConfigToRemoveList
OPTIONAL, -- Need N
    reportConfigToAddModList    ReportConfigToAddModList
OPTIONAL, -- Need N
    measIdToRemoveList          MeasIdToRemoveList
OPTIONAL, -- Need N
    measIdToAddModList          MeasIdToAddModList
OPTIONAL, -- Need N
    s-MeasureConfig CHOICE {
        ssb-RSRP RSRP-Range,
        csi-RSRP RSRP-Range
    }
OPTIONAL, -- Need M
    ssb-IdenticalPattern        BOOLEAN
OPTIONAL, -- Need R
    ssb-NrofDopplerShift        INTEGER (1..maxNrofDopplerShift)
OPTIONAL, -- Need R
    ssb-NrofIdenticalDoppler    INTEGER
        (1..maxNrofIdenticalDoppler)
OPTIONAL, -- Need R
    quantityConfig              QuantityConfig
OPTIONAL, -- Need M
    measGapConfig               MeasGapConfig
OPTIONAL, -- Need M
    measGapSharingConfig        MeasGapSharingConfig
OPTIONAL, -- Need M
    ...
}
```

Figure 18:
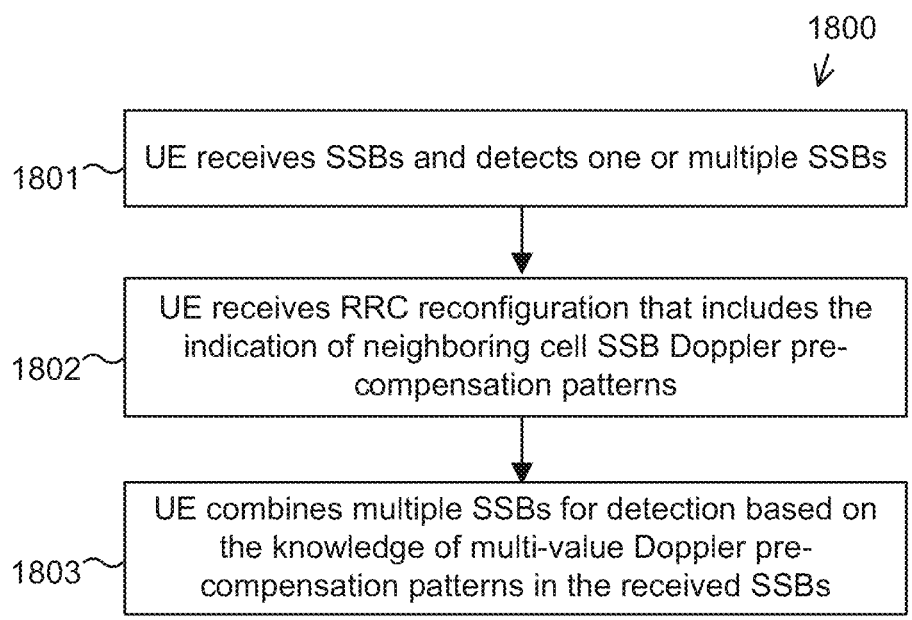
FIG. 18 illustrates a flowchart for an example of UE operations according to embodiments of the present disclosure.

FIG. 18 illustrates a flowchart for an example of UE operations according to embodiments of the present disclosure. The method 1800 depicted in FIG. 18 is for illustration only. Other embodiments could be used without departing from the scope of this disclosure.

FIG. 18 illustrates an exemplary operation flow 1800 at the UE. At operation 1801, the UE receives the SSBs and detect one or multiple SSBs. These SSBs may have been Doppler pre-compensated by the BS. At operation 1802, the UE receives an RRC reconfiguration message that includes the information regarding multi-value Doppler pre-compensation patterns. For example, information regarding whether the same Doppler pre-compensation pattern is being applied before and after handover, and/or the multi-value Doppler pre-compensation patterns of the target neighboring cell for the UE to measure and handover to. At operation 1803, based on knowledge of the Doppler pre-compensation pattern, the UE may accordingly combine multiple SSBs in the time domain to improve timing synchronization, FO estimation and RSRP measurement performance. For example, the information of multi-value Doppler pre-compensation pattern may be utilized by the connected UEs to perform SSB combining in order to improve SSB detection performance including timing synchronization and FO estimation, as well as RSRP measurement performance, for handover.

Although this disclosure has been described with an exemplary embodiment, various changes and modifications may be suggested to one skilled in the art. It is intended that this disclosure encompass such changes and modifications as fall within the scope of the appended claims.

What is claimed is:

1. A user equipment (UE), comprising:
   a transceiver configured to receive, using one or more beams, a plurality of sets of Doppler pre-compensated synchronization signals, each of the sets of Doppler pre-compensated synchronization signals corresponding to multi-value Doppler pre-compensation patterns each applied to a set of synchronization signals to pre-compensate the synchronization signals for Doppler effects; and
   a processor coupled to the transceiver, the processor configured to combine two or more of the received sets of Doppler pre-compensated synchronization signals in time domain in connection with one of timing synchronization detection, frequency offset (FO) estimation, or reference signal received power (RSRP) measurement.

2. The UE of claim 1, wherein the received sets of Doppler pre-compensated synchronization signals are combined based on one of predefined Doppler pre-compensation patterns or a received indication of Doppler pre-compensation patterns.

3. The UE of claim 2, wherein the received indication of Doppler pre-compensation patterns is received in connection with one of a system information block (SIB) or a radio resource control (RRC) reconfiguration message.

4. The UE of claim 2, wherein the received indication of Doppler pre-compensation patterns indicates Doppler pre-compensation patterns for a transmitting cell and Doppler pre-compensation patterns for one or more neighbor cells.

5. The UE of claim 1, wherein the set of synchronization signals comprises a synchronization signal block (SSB) including at least a primary synchronization signal (PSS) and a secondary synchronization signal (SSS).

6. The UE of claim 1, wherein an indication of Doppler pre-compensation patterns is received in a system information block (SIB), and
   wherein the processor is configured to combine the two or more of the received sets of Doppler pre-compensated synchronization signals in the time domain during one of data channel reception or handover.

7. The UE of claim 1, wherein an indication of Doppler pre-compensation patterns is received in a radio resource control (RRC) reconfiguration message
   wherein the processor is configured to combine the two or more of the received sets of Doppler pre-compensated synchronization signals in the time domain during handover.

8. A method, comprising:
   receiving, using one or more beams, a plurality of sets of Doppler pre-compensated synchronization signals, each of the sets of Doppler pre-compensated synchronization signals corresponding to multi-value Doppler pre-compensation patterns each applied to a set of synchronization signals to pre-compensate the synchronization signals for Doppler effects; and
   combining two or more of the received sets of Doppler pre-compensated synchronization signals in time domain in connection with one of timing synchronization detection, frequency offset (FO) estimation, or reference signal received power (RSRP) measurement.

9. The method of claim 8, wherein the received sets of Doppler pre-compensated synchronization signals are combined based on one of predefined Doppler pre-compensation patterns or a received indication of Doppler pre-compensation patterns.

10. The method of claim 9, wherein the received indication of Doppler pre-compensation patterns is received in connection with one of a system information block (SIB) or a radio resource control (RRC) reconfiguration message.

11. The method of claim 9, wherein the received indication of Doppler pre-compensation patterns indicates Doppler pre-compensation patterns for a transmitting cell and Doppler pre-compensation patterns for one or more neighbor cells.

12. The method of claim 8, wherein the set of synchronization signals comprises a synchronization signal block (SSB) including at least a primary synchronization signal (PSS) and a secondary synchronization signal (SSS).

13. The method of claim 8, wherein an indication of Doppler pre-compensation patterns is received in a system information block (SIB), and
   wherein the two or more of the received sets of Doppler pre-compensated synchronization signals are combined in the time domain during one of data channel reception or handover.

14. The method of claim 8, wherein an indication of Doppler pre-compensation patterns is received in a radio resource control (RRC) reconfiguration message
   wherein the two or more of the received sets of Doppler pre-compensated synchronization signals are combined in the time domain during handover.

15. A base station (BS), comprising:
   a processor configured to perform Doppler pre-compensation on a set of synchronization signals using each of multiple, multi-value Doppler pre-compensation patterns to generate a plurality of sets of Doppler pre-compensated synchronization signals each pre-compensated for Doppler effects; and
   a transceiver coupled to the processor, the transceiver configured to transmit the sets of Doppler pre-compensated synchronization signals using one or more beams.

16. The BS of claim 15, wherein the transceiver is configured to transmit a signal indicating the Doppler pre-compensation patterns used to generate the sets of Doppler pre-compensated synchronization signals, the signal indicating the Doppler pre-compensation patterns comprising one of a system information block (SIB) or a radio resource control (RRC) reconfiguration message.

17. The BS of claim 16, wherein the signal indicating the Doppler pre-compensation patterns is transmitted in connection with one of initial access by a user equipment (UE), idle UE cell reselection, connected UE data channel reception, or UE handover.

18. The BS of claim 16, wherein the signal indicating the Doppler pre-compensation patterns indicates Doppler pre-compensation patterns for a transmitting cell and Doppler pre-compensation patterns for one or more neighbor cells.

19. The BS of claim 15, wherein the set of synchronization signals comprises a synchronization signal block (SSB) including at least a primary synchronization signal (PSS) and a secondary synchronization signal (SSS).

20. The BS of claim 15, wherein an indication of Doppler pre-compensation patterns is transmitted in a system information block (SIB) for use in combining the two or more of the sets of Doppler pre-compensated synchronization signals in time domain during one of data channel reception or handover, and wherein the indication of Doppler pre-compensation patterns is transmitted in a radio resource control (RRC) reconfiguration message for use in combining the two or more of the sets of Doppler pre-compensated synchronization signals in the time domain during handover.

* * * * *